United States Patent
Woodward et al.

(10) Patent No.: US 10,264,454 B2
(45) Date of Patent: *Apr. 16, 2019

(54) SYSTEM AND METHOD FOR MOBILE NUMBER VERIFICATION

(71) Applicant: Early Warning Services, LLC, Scottsdale, AZ (US)

(72) Inventors: Eric Woodward, Scottsdale, AZ (US); Aaron Bartrim, Scottsdale, AZ (US); Betty Chan-Bauza, Scottsdale, AZ (US); Rodger Desai, Scottsdale, AZ (US); Matt Brown, Scottsdale, AZ (US); Chris Cunningham, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,459

(22) Filed: Jun. 11, 2018

(65) Prior Publication Data

US 2018/0359636 A1    Dec. 13, 2018

Related U.S. Application Data

(63) Continuation of application No. 14/798,155, filed on Jul. 13, 2015, now Pat. No. 10,015,670.

(60) Provisional application No. 62/023,657, filed on Jul. 11, 2014.

(51) Int. Cl.
*H04M 3/38* (2006.01)
*H04M 7/12* (2006.01)
*H04W 8/28* (2009.01)
*H04L 29/06* (2006.01)
*H04M 1/677* (2006.01)
*H04W 12/06* (2009.01)

(52) U.S. Cl.
CPC .......... *H04W 12/06* (2013.01); *H04M 1/677* (2013.01); *H04M 3/38* (2013.01); *H04M 7/126* (2013.01); *H04W 8/28* (2013.01); *H04L 63/18* (2013.01)

(58) Field of Classification Search
CPC ....... H04W 12/06; H04W 8/28; H04M 1/677; H04M 3/38; H04M 7/126
See application file for complete search history.

(56) References Cited

U.S. PATENT DOCUMENTS

| | | |
|---|---|---|
| 6,130,937 A | 10/2000 | Fotta |
| 2003/0138084 A1 | 7/2003 | Lynam et al. |
| 2014/0273965 A1 | 9/2014 | Raleigh et al. |

OTHER PUBLICATIONS

Signaling System No. 7 (SS7/C7): Protocol, Architecture, and Services, by Lee Dryburgh and Jeff Hewett, Cisco Press, Aug. 2, 2004 available at http://techbus.safaribooksonline.com/book/electricalengineering/communicationsengineering/1587050404/introductions-and-overviews/ch03.

(Continued)

*Primary Examiner* — David Orange

(74) *Attorney, Agent, or Firm* — Kilpatrick Townsend & Stockton LLP

(57) ABSTRACT

A mobile phone number that is been provided by a customer during enrollment is verified for use. SS7 protocol data associated with the mobile phone number is collected and evaluated, and if the condition of the subscriber account associated with phone number has changed or is inconsistent with the circumstances surrounding the enrollment of the phone number, the phone number is designated as one that is not to be called.

10 Claims, 3 Drawing Sheets

(56) References Cited

OTHER PUBLICATIONS

Perspectives on Retail Payments Fraud, Steve Malphrus, Feb. 11, 2009, Economic Perspectives, vol. XXXIII, No. 1, 2009, available at https://papers.ssrn.com/sol3/papers.cfm?abstract_id=1341233.

"Enterprise HLR Lookup Portal and API," published May 30, 2014 at blog YTD2525, citing hlr-lookups.com as the source, available at https://ytd2525.wordpress.com/2014/05/30/enterprise-hlr-lookup-portal-and-api/.

"Maximizing Consumer Contacts while Mitigating TCPA Risk," Neustar, Mar. 12, 2014, Becky Burr and Adam Russell, available at https ://www. n. eustar. biz/resou rces/videos/m itigate-tcpa-risk-and-co 11 ectio ns-video.

"Wireless Local Number Portability (WLNP)—frequently asked questions," FCC, May 18, 2016, available at https://www.fcc.gov/general/wireless-local-number-portability-wlnp (Year: 2016).

SYSTEM AND METHOD FOR MOBILE NUMBER VERIFICATION

CROSS REFERENCES TO RELATED APPLICATIONS

This application is a continuation of U.S. Nonprovisional application Ser. No. 14/798,155, filed on Jul. 13, 2015, which claims the benefit of U.S. Provisional Application No. 62/023,657, filed on Jul. 11, 2014, which are incorporated by reference in their entireties for all purposes as if fully set forth herein.

BACKGROUND OF THE INVENTION

Businesses often have the need to contact their customers by telephone. For example, banks and other financial institutions may need to contact a customer when an unexpected event has occurred, such as when a suspicious charge has been made to an account. Customers often provide a telephone number, such as a number to a mobile device, for a bank to call the customer, along with consent to use that number for specified reasons.

Problems may arise when a customer changes a phone number or perhaps inadvertently provides a wrong number when consenting to telephone calls. For example, the Telephone Consumer Protection Act (TCPA) and its implementing rules prohibit, among other things, the use of an automatic telephone dialing system to make a non-emergency call to mobile telephones without prior express consent of the mobile device user. If the user of the phone (such as a person who receives a number dialed by mistake) has not expressly consented to receiving a call at the mobile phone number, fines can be imposed on the entity making the call.

BRIEF SUMMARY OF THE INVENTION

There is provided, in accordance with embodiments of the present invention, a network/system and method for determine the risk of a phone number being or continuing to be eligible for calls.

In one embodiment, a method for a verifying phone number includes receiving an identified phone number provided by a person for use in contacting the person, using the identified phone number to obtain status data collected for the identified number from out-of-band protocol data (e.g., SS7 protocol data) generated when communications are made over a public switched telephone network for the identified number, and evaluating the status data for a condition of the identified phone number, the condition indicative of whether the authorized number is in use by the person for receiving communications.

A more complete understanding of the present invention may be derived by referring to the detailed description of the invention and to the claims, when considered in connection with the Figures.

DETAILED DESCRIPTION OF THE INVENTION

There are various embodiments and configurations for implementing the present invention. Generally, embodiments provide systems and methods for verifying that a phone number for use in communicating with a person, such as a customer, is authorized for such use.

In described embodiments, a mobile phone number is used by a financial institution for contacting a customer of the financial institution. The customer may have provided consent for making the call under certain situations, such as when a suspicious transaction has been posted to an account of the customer. The phone number is verified as the number for which a consent or authorization from the customer is applicable, in order to avoid dialing a number for which consent had not been obtained. More broadly, however, it should be understood that aspects of the invention pertain to verifying phone numbers or other identifiers used for communicating with various kinds of devices, including (but not limited to) landline telephones and mobile devices. Further, embodiments are not limited to voice communications, but may include any data messages, such as SMS (text) messages, as well as other communications for various commercial and noncommercial purposes, and may further include a communications initiated by entities other than financial institutions.

Figure 1:
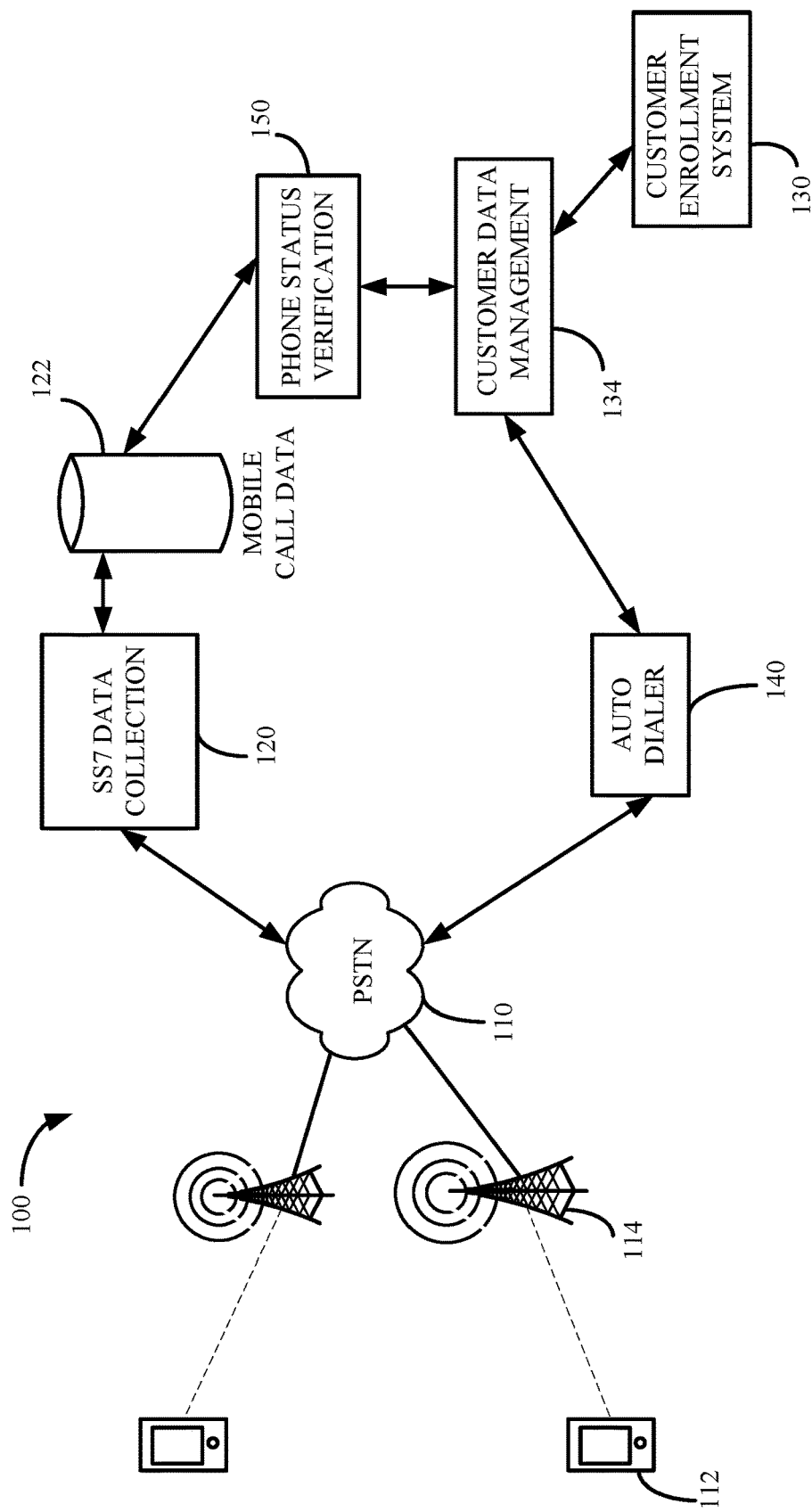
FIG. 1 is a block diagram showing a system for collecting telephone network data and using that data to verify that a phone number may be called.

Referring now to FIG. 1, a network 100 according to one embodiment of the invention is illustrated. In the network 100, telephone calls (and other communications and data messages) are sent through a telephone network 110 to/from various users at mobile devices 112 that may be communicating with the network 110 through wireless systems 114. The network 110 may be the public switched telephone network (PSTN).

In one embodiment, the network 110 employs out-of-band or common-channel signaling protocol, such as signaling system number 7 (SS7), in which various routing, telephone feature and other signaling/control data is carried over a common channel switching path (a packet switched network) separate from voice and data traffic. SS7 signaling protocol is widely used in the PSTN and virtually every telephone and data message sent over the PSTN has accompanying control packets that contain information about the call and the subscriber. Such data is often collected (as calls are made and routed over the PSTN) by an SS7 data collection system 120, and thereafter used for various purposes. For example, the system 120 may be operated by a mobile telephone company to determine the routing and billing of calls associated with the mobile devices 112. In other cases, third parties connected to the network 110 may also collect the same data for providing useful applications to various users, such billing and authentication. As an example, entities collect such SS7 protocol data and use device identification attributes in the data to subsequently authenticate a transaction (and a mobile device used for the transaction) when a consumer uses the mobile device as a payment card. The data collected by the system 120 is stored in a mobile call database 122.

In the illustrated embodiment, data stored in the database 122 is used to verify that a mobile phone number (Mobile Subscriber Integrated Services Digital Network Number—MSISDN) provided by a customer (with consent to use the phone number for various purposes) is validly associated with that customer. A customer, such as the customer of a bank who wants to be alerted of suspicious account activity via a live call, voice message or text message, enrolls with the bank at a customer enrollment system 130. The system 130 may be implemented by a website maintained by the bank, and during enrollment the customer may enter a mobile phone number to be used for contacting the customer. The phone number, along with other customer data, is maintained by or for the bank at a customer data management system 134. As will be more fully discussed later, when an alert is to be sent, a call may be initiated by an auto dialer 140 (or similar automated system) that automatically dials the mobile phone number of the customer (as accessed at the customer data management system 134) and provides a message (or, alternatively, may connect the customer to a representative of the bank who may provide information on the reason for the alert or call). The customer data management system 134 may periodically verify the availability phone numbers provided by customers (at the enrollment system 130) by communicating with a phone status verification system 150. The phone status verification system accesses the database 122 in order to retrieve SS7 protocol data relevant to the phone number provided by the customer.

In some embodiments (to be described in greater detail later), the phone status verification system 150 may also access other databases (e.g., a third-party ported number database) to use other (non-SS7) data, e.g., in conjunction SS7 protocol data, to determine the current eligibility of a phone number.

In one example (to be more fully described later), the data retrieved from the database 122 may include recent status information for the phone number sent over the network 110 as part of SS7 control data accompanying a call or message sent by one of the mobile devices 112. If the phone number associated with the mobile device has been deactivated (as indicated by Network Status data in the SS7 protocol data), the phone status verification system 150 may advise the bank operating the auto dialer 140 that there is risk that the number is no longer valid and that a call should not be made to that number. For example, if the phone number has been deactivated, and then subsequently assigned to a different user, a phone call made to the phone number would be to a person who has not consented to the call. As will be described below, various other data collected and stored at the database 122 may also be used for determining whether a customer phone number is validly authorized and should be dialed, or whether phone account circumstances indicated by the SS7 data are inconsistent with the number still being used by the person that provided consent. If a phone number is determined by the phone status verification system 150 as valid for the specific customer, then the auto dialer 140 will make a call to that number under the appropriate circumstances.

As should be appreciated, the database 122 may actual practice include more than one database or storage system. For example, SS7 protocol data may be captured on-the-fly by systems within the network 110, e.g., databases associated with various Service Control Points (SCP's) within the SS7 environment, which collect SS7 protocol or similar signaling data as calls are made within the network. The phone status verification system 150 may access such databases, through an SCP, obtain SS7 data based on the most recent calls made by the number in question, and thus in essence receive real-time data.

Figure 2:
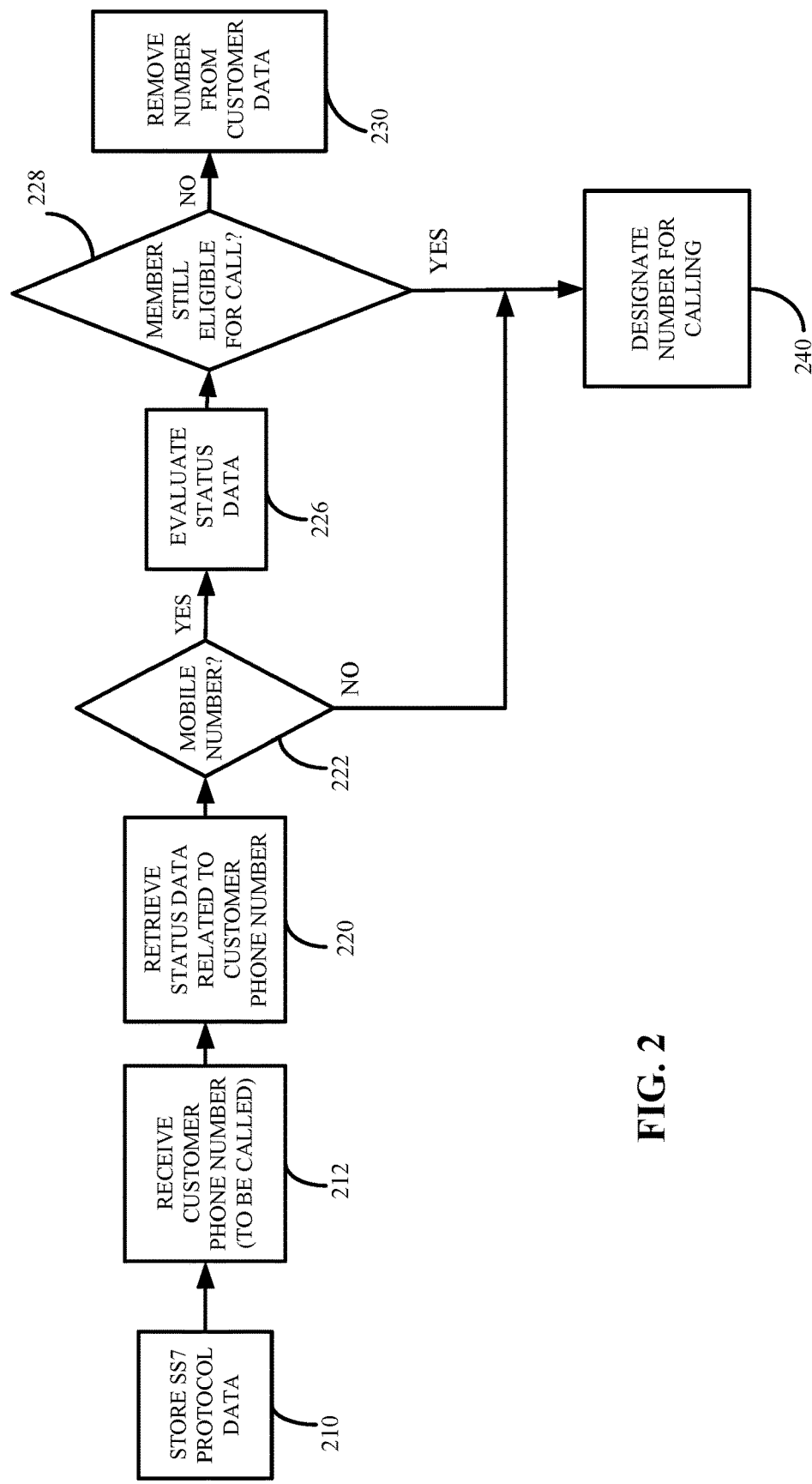
FIG. 2 is a flow diagram illustrating a process implemented in the system of FIG. 1.

FIG. 2 is a process implemented within the network 100 for purposes of carrying out aspects of the present invention. At step 210, SS7 protocol data collected from the telephone network 110 by the system 120 is stored in the database 122. At step 212, the phone status verification system 150 receives a phone number for a customer that is to be called in the event of certain circumstances (such as a suspicious transaction). In some cases, the phone number may be one of many phone numbers provided periodically by the bank from the customer data management system 134, in order to provide continuing verification of numbers previously provided by customers at the enrollment system 130. Alternatively, the customer data management system 134 may provide an individual phone number shortly before a call is made by the auto dialer 140 as a result of a circumstance under which a customer has agreed to receive a call.

At step 220 the phone status verification system 150 retrieves status data from the database 122 and related to the customer phone number received at step 212. In one embodiment, only mobile phone numbers are verified, since such calls may be subject to larger penalties than calls made to other devices (such as landline telephones). In such an embodiment, if the phone number received from the customer data management system 134 is determined to not be a mobile number (step 222), then the phone status verification system 150 returns a message designating the number as valid for calling, step 240. If the phone number received from the system 134 is a mobile number at step 222, then the phone status verification system 150 evaluates, at step 226, status data retrieved from the database system 122. The system 150 determines from that evaluation whether the number is still eligible for a call at step 228. Such determination at step 228 may involve looking at various kinds of status data from the database 122. Such status data may include, as examples:

Mobile ID Created date—this date reflects when the subscriber and mobile phone account (including phone number) have been created/setup, linking the subscriber and account/phone number. A mobile phone number may be re-assigned over time to different subscribers, as one subscriber closes an account and discontinues using the phone number, and then later a phone company assigns the same phone number to a new subscriber/account. Thus, a recent Mobile ID Created Date may reflect that the subscriber of the phone has changed and the number should not be used, if such date is after a customer has enrolled at system 130.

Number Change Event date—this date reflects when a mobile number has changed in a mobile phone account. The bank operating the customer data management system 134 may decide that a number change made after the date of enrollment should cause the phone number to appear on a "do not call" or "ineligible number" list, because of risk that the mobile device may be used by a person/subscriber who is not consented to calls.

Network Status—there are several types of statuses or conditions commonly used by carriers for an account associated with phone number, such as "Active," "Deactivated," "Suspended," "Absent," or "Unknown." If the status is "Deactivated," then in one embodiment the phone number is designated by the phone status verification system 150 as one that should be on a "do not call/ineligible number" list. For other conditions, a system may evaluate the risk associated with each of the various conditions considered (either in individually or in combination with other data that may be collected at the database 122 or elsewhere), based on guidelines provided by the bank to the phone status verification system 150, to determine a whether the phone number should be added to a "do not call/ineligible number" list. In one example, a bank may decide that, for any condition other than "Deactivated," it is likely that the person or customer providing consent is still using the phone number and that a call may be made to the phone number.

In another example, briefly mentioned earlier, the phone status verification system 150 accesses a ported number database for data indicating whether (and when) a customer may have changed carriers (with the number question still remaining with the same customer). In such case, system 150 may determine that, even if there has been a recent "mobile ID created" date, if such date is at about the same time or shortly after the porting date, the number is likely to still be in use by the customer that has authorized calls, and is still eligible to be called.

If the evaluation of the status data at step 228 results in a determination that a phone number is no longer eligible for calls, the number may be removed from the data maintained by the customer data management system 134 (step 230). Otherwise, the system 150 maintains the phone number as continuing to be eligible for receiving calls, step 240.

In the illustrated embodiment, the phone status verification system 150 may be operated by a third party having access to database 122. In other embodiments, the phone status verification system 150 may be operated by or on behalf of the bank to which the customer has provided a contact phone number.

Figure 3:
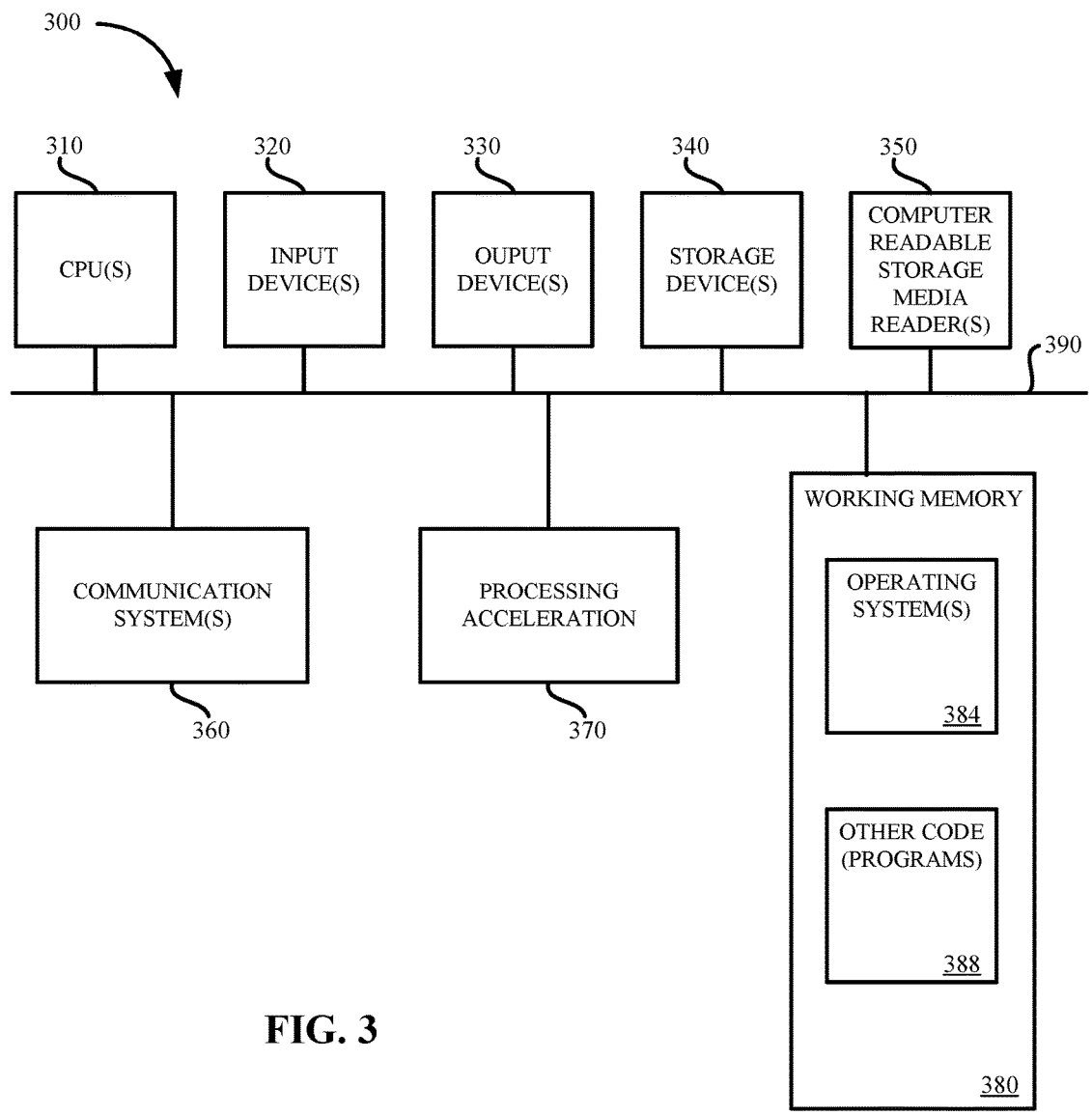
FIG. 3 is a block diagram illustrating an exemplary computer system at which embodiments of the present invention may be implemented.

FIG. 3 is a block diagram illustrating an exemplary computer system upon which embodiments of the present invention may be implemented. This example illustrates a computer system 300 such as may be used, in whole, in part, or with various modifications, to provide the functions of the SS7 data collection system 120, the customer data management system 134, and the phone status verification system 150, as well as other components and functions of the invention described herein.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage devices 340, representing remote, local, fixed, and/or removable storage devices and storage media for temporarily and/or more permanently containing computer-readable information, and one or more storage media reader(s) 350 for accessing the storage device(s) 340. By way of example, storage device(s) 340 may be disk drives, optical storage devices, solid-state storage devices such as a random access memory ("RAM") and/or a read-only memory ("ROM"), which can be programmable, flash-updateable or the like.

The computer system 300 may additionally include a communications system 360 (e.g., a modem, a network card—wireless or wired, an infra-red communication device, a Bluetooth™ device, a near field communications (NFC) device, a cellular communication device, etc.). The communications system 360 may permit data to be exchanged with a network, system, computer, mobile device and/or other component as described earlier. The system 300 also includes working memory 380, which may include RAM and ROM devices as described above. In some embodiments, the computer system 300 may also include a processing acceleration unit 370, which can include a digital signal processor, a special-purpose processor and/or the like.

The computer system 300 may also comprise software elements, shown as being located within a working memory 380, including an operating system 384 and/or other code 388. Software code 388 may be used for implementing functions of various elements of the architecture as described herein. For example, software stored on and/or executed by a computer system, such as system 300, can be used in implementing the process seen in FIG. 2.

It should be appreciated that alternative embodiments of a computer system 300 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the phone status verification system 150 may be implemented by a single system having one or more storage device and processing elements. As another example, the phone status verification system 150 system 110 may be implemented by plural systems, with their respective functions distributed across different systems either in one location or across a plurality of linked locations.

Moreover, while the various flows and processes described herein (e.g., those illustrated in FIG. 2) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise.

Although the invention has been described with respect to exemplary embodiments, it will be appreciated that the invention is intended to cover all modifications and equivalents within the scope of the forgoing description and/or the following claims.

What is claimed is:

1. A method for verifying that a phone number, after authorized by a customer for use in contacting the customer, subsequently continues to be authorized for use, comprising: receiving, from a customer, a phone number specified by the customer as authorized for use in contacting that customer; maintaining, at a customer data management system, the specified phone number on behalf of an entity desiring to contact the customer; when the customer is to be contacted, accessing the specified phone number at the customer data management system; sending, by a status verification system, a request for status data relating to the specified phone number, the status data collected from out-of-band protocol data generated when communications are made using the specified phone number and stored in a mobile call database, the out-of-band protocol data comprising signaling system 7 (SS7) protocol data, including a Mobile ID Created Date reflecting a date that a mobile account associated with the specified number has been set up; accessing, by the status verification system, a ported number database having porting data indicating whether the customer having the specified number has changed mobile carriers on a porting date; evaluating, at the status verification system, the status data stored in the mobile call database and the porting data in the ported number database for an eligible condition for the specified phone number, the eligible condition indicative that the specified number associated with the customer continues to be authorized for receiving communications and has not been assigned to a person that has not consented to receiving the communications, where communications to such a person is prohibited, the evaluating of the status data including: (1) determining that there is the eligible condition and that the specified phone number is authorized when the Mobile ID Created Date is about the same time as the porting date and (2) determining that the specified phone number is no longer authorized when the Mobile ID Created Date is not about the same time as the porting date.

2. The method of claim 1, wherein the SS7 protocol data comprises network status data.

3. The method of claim 1, wherein the specified phone number comprises a Mobile Subscriber Integrated Services Digital Network Number (MSISDN).

4. The method of claim 3, wherein the specified phone number is dialed using an auto dialer to make a voice phone call to the customer when it is determined that the specified phone number may be used for contacting the customer.

5. The method of claim 3, wherein a text message is sent to a mobile device identified by the specified phone number, when it is determined that the specified phone number may be used for contacting the customer.

6. The method of claim 1, further comprising: determining that the specified phone number is not a mobile phone number; and in response to determining that specified phone number is not a mobile phone number, determining that the specified number continues to be authorized for use in contacting the customer.

7. The method of claim 1, wherein the status data collected from out-of-band protocol data is generated when communications are made using the specified phone number within a public switched telephone network (PSTN).

8. The method of claim 1, wherein the status data is collected within the PSTN by a Service Control Point (SCP), and is thereby based on the most recent calls made within the PSTN.

9. The method of claim 8, wherein the status data is collected on-the-fly at multiple databases associated with multiple Service Control Points (SCPs) within the PSTN.

10. The method of claim 1, wherein the specified phone number is removed from data maintained at the customer data management system when it is determined that there is not the eligible condition determined for the specified phone number.

* * * * *